US006723776B2

(12) United States Patent
Sakaki et al.

(10) Patent No.: US 6,723,776 B2
(45) Date of Patent: Apr. 20, 2004

(54) LOW-MODULUS POLYMER COMPOSITION AND SEALANT USING THE SAME

(75) Inventors: Toshiaki Sakaki, Kobe (JP); Tetsuo Mizoguchi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 293 days.

(21) Appl. No.: 09/749,686

(22) Filed: Dec. 28, 2000

(65) Prior Publication Data

US 2002/0077409 A1 Jun. 20, 2002

(30) Foreign Application Priority Data

Jan. 14, 2000 (JP) .................. 2000-006902
Mar. 29, 2000 (JP) .................. 2000-092026
Jun. 15, 2000 (JP) .................. 2000-180236

(51) Int. Cl.$^7$ .................. C08K 5/01
(52) U.S. Cl. .................. 524/474; 524/491; 524/505; 524/515
(58) Field of Search .................. 524/505, 474, 524/491, 515

(56) References Cited

U.S. PATENT DOCUMENTS

| 4,313,867 A | | 2/1982 | Duvdevani | 260/33.6 |
|---|---|---|---|---|
| 4,764,535 A | | 8/1988 | Leicht | 521/51 |
| 5,936,037 A | * | 8/1999 | Tasaka | 525/92 A |
| 6,476,129 B2 | * | 11/2002 | Masubuchi | 525/71 |

FOREIGN PATENT DOCUMENTS

| EP | 0285929 | 12/1988 |
|---|---|---|
| EP | 0653464 | 5/1995 |
| EP | 1057865 | 12/2000 |
| JP | 08176394 | 9/1996 |

OTHER PUBLICATIONS

Database WPI, Section Ch, Week 198441, Derwent Publications Ltd., London, GB; Class A18, AN 1984–254572, XP002164343.
Database WPI, Section Ch, Week 199512, Derwent Publications Ltd., London, GB; Class A18, AN 1995–085550; XP002164344.
Database WPI, Section Ch, Week 199701, Derwent Publications Ltd., London, GB; Class A17, AN 1997–007514, XP002164345.
Database WPI, Section Ch, Week 198816, Derwent Publications Ltd., London, GB; Class A18, AN 1988–108882, XP 002164346.

* cited by examiner

Primary Examiner—Peter D. Mulcahy
(74) Attorney, Agent, or Firm—Birch, Stewart, Kolasch & Birch, LLP

(57) ABSTRACT

Disclosed are a polymer composition comprising (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer, (B) a rubber component containing an ethylene-propylene-diene rubber, and (C) a softener, or a polymer composition further comprising (a) an olefin polymer and, if necessary, (D) carbon black, wherein the amount of the component (C) is not less than 200 parts by weight based on 100 parts by weight of the total amount of the components (A) and (B) or (A), (B) and (a), and at least portion of the rubber component (B) is crosslinked by dynamic crosslinking, and a sealant made by using the same.

14 Claims, No Drawings

LOW-MODULUS POLYMER COMPOSITION AND SEALANT USING THE SAME

BACKGROUND OF THE INVENTION

The present invention relates to a low modulus polymer composition and a sealant using the same. More particularly, the present invention relates to a polymer composition which exhibits a low modulus at a very wide range of temperature (i.e. excellent flexibility), less thermal deformation at high temperature and a small compression set at low temperature, and which also has tack, and a sealant which is especially suited for use in a telecommunication cable closure.

Sealants used in a telecommunication cable closure require excellent flexibility, conformability, weather resistance and aging resistance, and small compression set.

As a conventional sealant, there can be used hydrogenated thermoplastic elastomers such as hydrogenated styrene-isoprene block copolymer, hydrogenated styrene-butadiene block copolymer, hydrogenated styrene-isoprene-styrene block copolymer (SIS) [i.e. styrene-ethylene-propylene-styrene block copolymer, hereinafter referred to "as "SEPS"], and hydrogenated styrene-butadiene-styrene block copolymer (SBS) [i.e. styrene-ethylene-butylene-styrene block copolymer, herein after referred to as "SEBS"]and rubber shaving no double bond on a main chain, such as ethylene-propylene-diene rubber (EPDM).

A softener is added in the thermoplastic elastomers and rubbers to improve the flexibility. As the softener, paraffin oil having a pour point of not lower than −20° C. and particularly about −15° C. is often used.

However, a sealant composed of a rubber such as EPDM requires a vulcanizing process which takes long time to mold so that the production efficiency is low. Although recycling of a resource has recently been required in view of the environmental protection, it is scarcely possible to recycle the sealant composed of the rubber such as EPDM alone in practice. Expensive facilities and much labor, for example, use of supercritical water and decomposition by high concentration of ozone are required to dare to recycle EPDM rubber.

Various EPDM(s) are known, components of which are changed according to the purposes thereof. A sealant of a telecommunication cable closure is required to have a small compression set at a low temperature ranging from −30 to 0° C. and to be superior in flexibility. However, it is difficult that a conventionally known EPDM satisfies the properties described above. For example, a sealant using a conventionally known EPDM is likely to cause leakage as a result of deterioration of the sealing ability within a low temperature range because the compression set at −20° C. exceeds 90% and a change in hardness between room temperature and −20° C. is very large. Also there is a problem that compression required to seal can not be conducted sufficiently because the hardness increases within the above low temperature range.

On the other hand, any of the diblock copolymer, SEPS and SEBS has thermoplasticity and the sealant using them causes severe deformation at high temperature. These thermoplastic elastomers generally have such characteristics that the compression set rapidly increases within the low temperature region because oil having a high pour point is incorporated therein. A large compression set deteriorates sealing ability, thereby to cause problems such as water permeation and leakage of an inner gas.

SUMMARY OF THE INVENTION

Therefore, an object of the present invention is to provide a polymer composition wherein the problems described above have been solved. That is, an object thereof is to provide a low modulus polymer composition which can be injection-molded, and is recyclable and easy to mold and process and is also superior in flexibility (low modulus), and which shows a small compression set within a low temperature range and less deformation at high temperature and also has good mechanical strength such as tear strength and surface strength, large tensile strength and elongation at breakage, and good surface texture on molding.

Another object of the present invention is to provide a sealant which exhibits excellent flexibility and small compression set, which are particularly suited for use in a telecommunication cable closure, and also has large tensile strength and large elongation at breakage as well as tack.

To attain the objects described above, the present inventors have intensively studied, thus obtaining a low modulus polymer composition comprising a thermoplastic elastomer such as SEPS or SEBS, and EPDM, portion of which exists in the thermoplastic elastomer dispersed finely after being dynamically vulcanized, and oil having a pour point of not higher than −35° C. in the amount of not less than 200 parts by weight based on 100 parts by weight of the total amount of the thermoplastic resin and rubber (Japanese Patent Application No. 2000-6902). This material has such an advantageous feature suited for use as a sealant that it can be injection-molded and is recyclable and shows a small compression set at the temperature within a range from low temperature (−30° C.) to high temperature (70° C.) and a very low modulus.

Furthermore, the present inventors have obtained a low modulus polymer composition further comprising an olefin polymer so as to improve the brittleness, mechanical strength and extrusion texture on molding of the polymer composition while maintaining such a feature that the above low modulus polymer composition can be injection-molded and is recyclable and shows a small compression set at the temperature within a range from low temperature (−30° C.) to high temperature (70° C.) and a very low modulus (Japanese Patent Application No. 2000-92026).

Furthermore, the present inventors have succeeded in increasing the tensile strength, elongation at breakage and the tear strength by adding carbon black to the above low modulus polymer composition containing an olefin polymer.

Thus, the present invention provides the following low modulus polymer compositions and a sealant using the same.

(1) A low modulus polymer composition comprising:
   (A) at least one thermoplastic elastomer selected from the group consisting of a hydrogenated styrene-isoprene-styrene block copolymer, a hydrogenated styrene-butadiene-styrene block copolymer and a styrene-ethylene-(ethylene-propylene)-styrene block copolymer,
   (B) a rubber component containing an ethylene-propylene-diene rubber, and
   (C) a softener, wherein
      the amount of the softener (C) is not less than 200 parts by weight based on 100 parts by weight of the total amount of the components (A) and (B) and at least portion of the component (B) is crosslinked by dynamic crosslinking.

(2) A low modulus polymer composition comprising:
  (A) at least one thermoplastic elastomer selected from the group consisting of a hydrogenated styrene-isoprene-styrene block copolymer, a hydrogenated styrene-butadiene-styrene block copolymer and a styrene-ethylene-(ethylene-propylene)-styrene block copolymer,
  (a) an olefin polymer,
  (B) a rubber component containing an ethylene-propylene-diene rubber, and
  (C) a softener, wherein
    the amount of the softener (C) is not less than 200 parts by weight based on 100 parts by weight of the total amount of the components (A), (a) and (B), and
    at least portion of the rubber component (B) is crosslinked by dynamic crosslinking.
(3) A low modulus polymer composition comprising:
  (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer,
  (a) an olefin polymer,
  (B) a rubber component containing an ethylene-propylene-diene rubber,
  (C) a softener, and
  (D) carbon black, wherein
    the amount of the softener (C) is not less than 200 parts by weight based on 100 parts by weight of the total amount of the components (A), (a) and (B), and
    at least portion of the rubber component (B) is crosslinked by dynamic crosslinking.
(4) A sealant comprising the low modulus polymer composition of any one of the terms (1) to (3).

The low modulus polymer compositions (1), (2) and (3) according to the present invention respectively have the composition described above and the degree of the flexibility thereof usually corresponds to hardness of not more than 10 when measured by a method of Japan Industrial Standard (JIS) A Hardness. When the degree of the flexibility (low modulus) of the composition is represented by the above hardness, modulus of these compositions is low enough to be injection-molded in practice.

Regarding the sealant in a telecommunication cable closure, the hardness is not less than 10, preferably not less than 20, and more preferably not less than 30, when the hardness of the sealant is represented by the degree of penetration of a 1/1-sized cone into the material at 23° C. Modulus of the above polymer composition of the present invention is low enough to satisfy the above range.

The low modulus polymer composition (1) is obtained by alloying the rubber component (B) with the thermoplastic elastomer (A) in the presence of a softener. As used herein, the term "alloying" is considered to be a state where the thermoplastic elastomer (A) is uniformly mixed with the EPDM rubber and the EPDM rubber exists as a dispersed phase if the thermoplastic elastomer is regarded as a continuous phase.

In the present invention, the low modulus polymer composition (2) is obtained by dynamic crosslinking of the rubber component (B) containing EPDM, the thermoplastic elastomer (A) and the olefin polymer (a) in the presence of a softener. If the thermoplastic elastomer (A), the olefin polymer (a) and the rubber component (B) are uniformly mixed by this "dynamic crosslinking" and the thermoplastic elastomer (A) and the olefin polymer (a) are regarded as a continuous phase, the rubber component (B) is considered to exist as the state where the rubber component (B) exists as a dispersed phase in the continuous phase (so-called sea-island structure).

In the present invention, regarding the low modulus polymer composition (3), physical properties such as tensile strength, elongation at breakage and tear strength are further improved by adding carbon black to the above low modulus polymer composition (2), together with the softener.

Although the thermoplastic elastomer (A) itself has characteristics of deforming at high temperature (thermal deformability), the deformation at high temperature is substantially suppressed in the low modulus polymer composition because the existence of crosslinked rubber component (B). Moreover, the low modulus polymer composition of the present invention retain characteristic such as small compression set at low temperature, which are characteristics of the rubber component (B) (especially EPDM in the rubber component (B)) at low temperature. Such characteristics can not be obtained by the thermoplastic elastomer (A) alone.

The low modulus polymer compositions (1), (2) and (3) of the present invention can be molded by means of injection molding in the same manner as in case of the thermoplastic elastomer (A) and a general thermoplastic resin, and a molded article thereof can also be easily recycled. That is, the low modulus polymer composition of the present invention has such a feature that it is flexible and has large tensile strength, large breaking tension and large tear strength, and can be easily molded by means of injection molding and injection-molded again after the molded product is cut into small pieces (that is, the composition is recyclable), and also shows a small compression set even at low temperature and less thermal deformation at high temperature.

The sealant of the present invention has such a feature that it is prepared by using the low modulus polymer composition of the present invention. The sealant in a telecommunication cable closure requires the weather resistance, aging resistance and retention of elasticity at service temperature (small compression set), including excellent flexibility and conformability. The sealant of the present invention is remarkably superior in weather resistance because any of the thermoplastic elastomer (A), rubber component (B) containing EPDM and olefin polymer (a) has no double bond on a main chain. The sealant is also superior in aging resistance because they have no double bond on a main chain.

The sealant of the present invention is suited for sealing a gap between a cable and a closure body or a space between a closure body and a wire, namely, it is suited for use as a sealant of a telecommunication cable closure.

In the present invention, the term "closure" refers to a container for branching and connecting electric wires and optical fibers.

DETAILED DESCRIPTION OF THE INVENTION

In the low modulus polymer composition (1) of the present invention, a mixing ratio of the rubber component (B) containing EPDM to the thermoplastic elastomer (A) is chosen so that the above function is exerted. Usually, the amount of the rubber component (B) containing EPDM is within a range from 25 to 75% by weight, while the amount of the thermoplastic elastomer (A) is within a range from 75 to 25% by weight. Preferably, the amount of the rubber component (B) containing EPDM is within a range from 30 to 70% by weight, while the amount of the thermoplastic elastomer (A) is within a range from 70 to 30% by weight. When the amount of the rubber component is too large, it is difficult to obtain the composition suitable for injection because it comes out from the dye of the extruder in powder state. On the other hand, when the amount of the rubber component is too small, the compression set becomes larger, and the flexibility is sacrificed.

In the low modulus polymer compositions (2) and (3) of the present invention, a mixing ratio of the thermoplastic elastomer (A) and olefin polymer (a) to the rubber component (B) is appropriately chosen so that the above various characteristics are sufficiently exhibited. The mixing ratio of the thermoplastic elastomer (A) and olefin polymer (a) to the rubber component (B) is usually within a range from 75:25 to 25:75, and preferably from 70:30 to 30:70, in terms of a weight ratio. When the amount of the rubber component (B) is too large, it is difficult to obtain the composition suitable for injection because it comes out from the dye of the extruder in powder state. On the other hand, when the amount of the rubber component (B) is too small, the compression set becomes larger, and the flexibility is sacrificed.

The amount of the olefin polymer (a) is also selected appropriately so that various characteristics described above can be sufficiently exhibited. The amount is not specifically limited, but is usually within a range from 2 to 50 parts by weight, preferably from 5 to 40 parts by weight, and more preferably from 7 to 35 parts by weight, based on 100 parts by weight of the total amount of the thermoplastic elastomer (A), olefin polymer (a) and rubber component (B). When the amount of the olefin polymer (a) is less than the above range, it becomes impossible to obtain the effect of improving the surface texture on molding and improving the mechanical strength such as tear strength or surface strength. On the other hand, when the amount of the olefin polymer (a) exceeds the above range, the hardness increases to impair the flexibility, whereby the resulting composition becomes unsuitable to use as the sealant.

The low modulus polymer composition of the present invention has a feature that at least portion of the rubber component containing EPDM is dynamically crosslinked. As used herein, the term "dynamic crosslinking" refers to a technique of blending the thermoplastic resin with EPDM in a molten state and adding a chemical which crosslinks rubber, thereby to crosslink the EPDM rubber during the mixing and to finely disperse the rubber in the thermoplastic resin. By this dynamic crosslinking, the above alloying can be uniformly attained with good efficiency, thereby providing the composition with the performances described above.

The state where at least portion of the rubber component containing EPDM is dynamically crosslinked can be judged whether or not the amount of the insoluble component ratio after crosslinking becomes larger than the amount of the solvent insoluble component ratio before crosslinking when the resulting low modulus polymer composition is dissolved in the solvent. In other words, dynamic crosslinking is the state where the insoluble content (%) after mixing is larger than that before mixing. Generally, preferred are those wherein the rubber component is crosslinked in the amount of not less than 50 parts by weight or more among 100 parts by weight.

The chemical for dynamic crosslinking can be appropriately selected, but a resin-type vulcanizing agent is preferably used.

The closure material requires the weather resistance, aging resistance, elasticity at service temperature and small compression set, which means that set is recovered when the compression is released, including excellent flexibility and conformability. The thermoplastic resin and EPDM rubber, which constitute the composition of the present invention, is remarkably superior in weathering resistance because any of them has no double bond on a main chain. The sealant is also superior in aging resistance because they have no double bond on a main chain.

In the low modulus polymer compositions (1), (2) and (3) of the present invention, the softener serves to provide the polymer composition with the flexibility. Particularly, by adding paraffin oil having a pour point of not higher than −35° C., the flexibility at low temperature is secured, thereby making it possible to reduce the compression set.

The amount of the softener (C) is set to 200 parts by weight or more, preferably 250 parts by weight or more, and more preferably 300 parts by weight or more, based on 100 parts by weight of the total amount of the thermoplastic resin (A) and rubber component (B) or 100 parts by weight of the total amount of the thermoplastic resin (A), olefin polymer (a) and rubber component (B).

When the amount of the softener (C) is less than the above range, there is a fear that it becomes impossible to provide the polymer composition with sufficient flexibility and to reduce the hardness. On the other hand, the upper limit of the amount of the softener (C) is not specifically limited as far as various characteristics described above of the polymer composition of the present invention are not impaired and the softener does not leach out, but the amount is preferably set to 1000 parts by weight or less based on 100 parts by weight of the total amount of the components (A) and (B) or 100 parts by weight of the total amount of the components (A), (a) and (B).

The amount of the carbon black (D) in the low modulus polymer composition (3) of the present invention is set within a range from 5 to 50 parts by weight, preferably from 10 to 40 parts by weight, and more preferably from 15 to 35 parts by weight, based on 100 parts by weight of the total amount of the thermoplastic resin (A), olefin polymer (a) and rubber component (B). When the amount of the carbon black (D) is less than the above range, it is not enough to improve the tensile strength (TB), elongation at breakage (EB) and tear strength (TR). On the other hand, when the amount exceeds the above range, the gel fraction of the low modulus polymer composition is reduced on the contrary and the compression set increase, which is not preferable.

By the way, in case where carbon black is added to a conventional rubber composition, the higher the amount, the more the modulus (tensile stress) and also the tear strength are (to the contrary, the less elongation at breakage). Therefore, carbon black is sometimes added in the same amount as that of 100 parts by weight of the rubber. Almost all of the case, carbon black is added in the amount of 50 parts or more. However, in a dynamically crosslinked material composed of SEEPS/olefin polymer/EPDM, it has been found that an influence of the amount of carbon black to low modulus polymer composition of the present invention on the tensile strength, elongation at breakage and tear strength is different from that in case of a conventional rubber composition. The present invention has a feature that the amount of carbon black is set as described above.

The carbon black (D) preferably has such characteristics that the particle diameter is not more than 80 nm, preferably not more than 60 nm, and DBT oil absorption amount is not less than 80 cc/100 g, preferably not less than 100 cc/100 g.

In the present invention, the softener (C) is preferably paraffin oil or preferably has a pour point of not higher than −35° C. In the low modulus polymer composition of the present invention, the softener serves to provide the polymer composition with the flexibility. Particularly, by adding a softener having a pour point of not higher than −35° C. (more preferably paraffin oil having a pour point of not higher than −35° C.) among various softeners, the flexibility at low temperature is secured, thereby making it possible to further reduce the compression set. Paraffin oil having a large molecular weight is particularly preferable because of low volatility.

The olefin polymer (a) is preferably polypropylene (PP).

In case where particularly excellent characteristics at low temperature are required, the ethylene content of EPDM in the rubber component (B) is preferably not more than 55% by weight.

The respective components, which constitute the low modulus polymer composition of the present invention, and preparation method will be described in more detail below.

[Thermoplastic Elastomer (A)]

It is required that each of the components, which constitute the low modulus polymer composition of the present invention, itself has the flexibility even if the softener is not added in order to use the composition as a sealant having the cone penetration within the above range.

Examples of the component, which exhibits the flexibility without requiring the softener, include so-called thermoplastic elastomers such as styrene-isoprene-styrene block copolymer (SIS) and its hydrogen adduct (SEPS), styrene-butadiene-styrene block copolymer (SBS) and its hydrogen adduct (SEBS), styrene-ethylene-(ethylene-propylen)-styrene block copolymer (SEEPS), and styrene-isobutylene-styrene block copolymer (SIBS).

As the component (A) in the low modulus polymer composition of the present invention, the thermoplastic elastomers described above can be used as far as the weather resistance and aging resistance of the composition are not taken into consideration. Among these thermoplastic elastomers, SIS, SEPS, SEBS, SBS, and SEEPS are preferably used because the compression set of SIBS is not so small.

When using the composition of the present invention as the sealant of a telecommunication cable closure, SEPS, SEBS and SEEPS, which scarcely have a double bond or do not have any double bond in a soft segment, are suitable because the weather resistance must be taken into consideration. SIBS is superior in weather resistance because it does not any double bond in the soft segment, but it is necessary to take the fact the compression set of SIBS is not so small into consideration.

Accordingly, SEPS, SEBS and SEEPS are preferably used.

Although SEPS is obtained by hydrogenating SIS, ethylene and propylene are alternatively arranged, invariably. On the other hand, SEEPS has such a structure that an ethylene unit exists in SEPS in the form of a block. That is, a unit only composed of ethylene exists in the form of a block, including a unit wherein ethylene and propylene are alternatively arranged.

In the thermoplastic elastomer described above, when the amount of styrene (corresponding to a hard segment) in the block copolymer is small, the elasticity at room temperature is reduced (that is, the compression set becomes larger). On the other hand, when the amount is large, the elastomer becomes harder. The amount of styrene is preferably within a range from 10 to 35% by weight.

The larger the molecular weight of the thermoplastic elastomer described above, the higher the strength, and the larger the absorption amount of the softener. Accordingly, it is advantageous to use a thermoplastic elastomer having a large molecular weight in the polymer composition of the present invention. Specifically, it is necessary that the molecular weight of the thermoplastic elastomer is generally not less than 100,000, preferably not less than 150,000, and more preferably 200,000.

Specific examples of SEPS among the thermoplastic elastomer include trade name of "Septon 2063" (styrene content: 13% by weight) manufactured by Kuraray Co., Ltd., "Septon 2023" manufactured by the same company, "Septon 2002" manufactured by the same company, "Septon 2005" manufactured by the same company, and "Septon 2014" manufactured by the same company.

Specific examples of SEBS include trade name of "Tuftec" (styrene content: 20% by weight) manufactured by Asahi Chemical Ind., trade name of "KRATON G1650" (styrene content: 29% by weight) manufactured by Shell Japan Co., Ltd., and trade name of "Elastomer AR730" manufactured by ARONKASEI CO., LTD.

Specific examples of SEEPS include trade name of trade name of "Septon 4077" (styrene content: 30% by weight) manufactured by Kuraray Co., Ltd., "Septon 4055" (styrene content: 30% by weight) manufactured by the same company, and "Septon 4033" (styrene content: 30% by weight) manufactured by the same company.

[Olefin Polymer (a)]

Examples of the olefin polymer (a) in the low modulus polymer composition of the present invention include polypropylene polymer (PP) and polyethylene polymer (PE). Among these polymers, a polypropylene polymer is preferably used in order to attain low hardness of the polymer composition and to reduce an adverse influence which can be exerted on characteristics at low temperature.

The polypropylene polymer is not limited to a homopolymer of propylene (PP homopolymer) and, for example, it may be a block copolymer having a polyethylene block (P/E block copolymer) or a random copolymer having an ethylene moiety (P/E random copolymer).

Specific examples of the polypropylene polymer include trade name of "Novatec PP BC6" (P/E block copolymer) manufactured by Japan Polychem Corporation, trade name of "Novatec PP MG05BS" (P/E random copolymer) manufactured by the same Company, and trade name of "Novatec PP FY6H" (PP homopolymer) manufactured by the same Company.

[Rubber Component (B)]

The rubber component (B) in the low modulus polymer composition of the present invention may be preferably those which are miscible with the thermoplastic elastomer (A) and has affinity with the thermoplastic elastomer (A). Taking use of the polymer composition of the present invention as a sealant of a telecommunication cable closure into consideration, those having excellent weather resistance and a small compression set are more preferable.

Such a rubber component includes, for example, EPDM. Although a rubber other than EPDM may be blended, together with EPDM, the amount of EPDM in the rubber is preferably controlled to 50% by weight or more. As the rubber other than EPDM, for example, there can be used butyl rubber (IIR), butadiene rubber (BR), isoprene rubber (IR), styrene-butadiene rubber (SBR), chloroprene rubber (CR), natural rubber (NR), 1,2-polybutadiene, acrylonitrilebutadiene rubber (NBR), ethylene-propylene rubber (EPM), acrylic rubber (ACM), and chlorosulfonated polyethylene (CSM).

EPDM makes it possible to add a large amount of the softener because the strength increases when the ethylene content is large. On the other hand, when the temperature is lower than 0° C., EPDM with high content of ethylene is crystallized and the hardness rapidly increases, resulting in large compression set. Therefore, EPDM having an ethylene content of not more than 60% by weight, preferably not more than 55% by weight, is preferably used in the field where it is required to exhibit a function such as flexibility even at low temperature and to suppress the compression set, for example, sealant, especially sealant for a cable closure.

Diene constituting EPDM is generally ethylidene norbornene or dicyclopentadiene, but either diene will do for EPDM in the present invention. The diene amount in EPDM is advantageously large because the vulcanization rate increases, but is preferably not more than 15% by weight, and more preferably not more than 10% by weight in view of the weathering resistance and aging resistance.

[Softener (C)]

The softener (C) in the present invention is added according to the desired sealant hardness in the low modulus polymer composition or sealant. Such a softener is preferably a softener having high affinity with EPDM, SEPS, SEBS and SEEPS, and paraffin oil is preferable. A softener whose pour point was lowered by removing a wax component is preferably used because the polymer composition of the present invention sufficiently exhibits a function as a sealant at low temperature.

The pour point of paraffin is generally −15° C. according to the measuring standard defined in JIS K2269. In the field where characteristics at low temperature are required as described above, paraffin oil having a pour point of not higher than −35° C. is preferable. Specific examples of the paraffin oil include trade name of "Diana process oil PX-90" (pour point: −45° C.) manufactured by Idemitsu Kosan Co. Ltd.

[Carbon Black (D)]

Carbon black (D) in the present invention is Added exclusively in the low modulus polymer composition and sealant for the purpose of improving the tensile strength (TB), elongation at breakage (EB) and tear strength (TR). Such carbon black is preferably carbon black which belongs to furnace black, and is particularly preferably SAF (Super Abrasion Furnace), ISAF (Intermediate Super Abrasion Furnace), HAF (High Abrasion Furnace), FEF (Fast Extrusion Furnace), or GPF (General Purpose Furnace).

[Crosslinking Agent, Vulcanization Accelerator and Vulcanization Activator]

In the present invention, conventionally known vulcanizing agents such as sulfur and conventionally known resin vulcanizing agents can be used as the crosslinking agent for crosslinking the rubber component such as EPDM. In the present invention, a resin vulcanizing agent is preferably used.

The resin vulcanizing agent includes, for example, alkyl phenol-formaldehyde resin and halogenated phenol-formaldehyde resin. Specific examples thereof include trade name of "TACKIROL" series manufactured by Taoka Chemical Co., Ltd.

The resin vulcanizing agent promotes vulcanization more rapidly than sulfur. The amount of the crosslinking agent is usually within a range from 2 to 20 parts by weight, and preferably from 5 to 17 parts by weight, based on 100 parts by weight of the rubber component such as EPDM rubber.

In the present invention, vulcanization accelerators and vulcanization activators (auxiliary vulcanization accelerators) may be added, in addition to the crosslinking agents. The vulcanization accelerator is added exclusively on crosslinking with sulfur, and there can be used conventionally known thiazole, thiuram, dithiocarbamate and sulfenamide vulcanization accelerators. The vulcanization accelerator can be usually used in the amount within a range from about 1 to 10 parts by weight based on 100 parts by weight of the rubber component such as EPDM rubber. As the vulcanization activator, for example, zinc oxide and stearic acid can be used. The vulcanization activator can be usually used in the amount within a range from about 0.1 to 100 parts by weight based on 100 parts by weight of the EPDM rubber.

[Other Additives]

For the purpose of improving the quality, processing aids, reinforcers, colorants, antioxidants, light stabilizers, ultraviolet light absorbers, flame retardants, and tackifiers can be appropriately added to the low modulus polymer composition of the present invention.

The reinforcer includes, for example, silica and can be added in the amount within a range from 0 to 300 parts by weight based on 100 parts by weight of the total amount of the thermoplastic elastomer (A) and rubber component (B) or 100 parts by weight of the total amount of the components (A) and (B) and olefin polymer (a). The filler includes, for example, calcium carbonate, clay or magnesium carbonate and can be added in the amount within a range from 0 to 300 parts by weight based on 100 parts by weight of the total amount of the components (A) and (B) or 100 parts by weight of the total amount of the components (A), (B) and (a). The flame retardant includes, for example, aluminum hydroxide, or antimony trioxide and can be added in the amount within a range from 0 to 100 parts by weight based on 100 parts by weight of the total amount of the components (A) and (B) or 100 parts by weight of the total amount of the components (A), (B) and (a). The tackifier includes, for example, coumarone-indene resin, aliphatic hydrocarbon resin, alicyclic hydrocarbon resin, or low molecular weight component such as liquid polybutene or liquid polyisoprene and can be added in the amount within a range from 0 to 20 parts by weight based on 100 parts by weight of the total amount of the components (A) and (B) or 100 parts by weight of the total amount of the components (A), (B) and (a).

[Preparation of Low Modulus Polymer Composition]

The low modulus polymer composition of the present invention can be prepared by kneading the thermoplastic elastomer (A), the rubber component (B) containing EPDM, the softener (C) and, optionally, the olefin polymer (a) and carbon black, together with proper additives, and dynamically crosslinking the kneaded mixture.

That is, the low modulus polymer composition of the present invention can be obtained by passing through the step (i) of chopping and kneading the rubber component (B), a proper vulcanizing agent and a proper vulcanization activator, the step (ii) of adding the thermoplastic elastomer (A) and blending the mixture, and the step (iii) of kneading these blended mixtures and optionally adding a crosslinking agent and a proper additive, thereby dynamically crosslinking to crosslink at least portion of the rubber component (B).

When the large amount of the softener (C) is added at a time to the rest of component, uniform dispersion can not sometimes be attained because of slip in a kneader or an extruder. In this case, the softener may be added separately in the steps (i) and (ii). Uniformly dispersed state can be obtained by making the thermoplastic absorb the softener in advance, mixing the thermoplastic resin containing the softener with the pelletized EPDM rubber (it is advantageous to previously incorporate a vulcanizing agent into the rubber) and kneading the mixture.

The low modulus polymer composition of the present invention can also be obtained by blending all components including the thermoplastic elastomer (A), the rubber component (B) containing EPDM and, optionally, the olefin polymer (a) and carbon black, adding the softener (C) in the components, and dynamically crosslinking the mixture.

The dynamic crosslinking can be carried out by using a conventional rubber kneader. For example, an extruder, a kneader and a Banbury mixer can be used. Among these kneaders, an extruder is preferable and a twin-screw extruder is particularly preferable.

The rotation speed on molding is preferably set within a range from 50 to 400 rpm. The dynamic crosslinking is usually conducted at a temperature within a range from 160 to 220° C.

[Sealant]

The sealant of the present invention is prepared by using the low modulus polymer composition and is suited for use as a sealant for sealing a gap between a cable and a closure body.

Since the sealant is preferably used as a sealant of a telecommunication cable closure, it is necessary that the hardness is usually 10 or more at 23° C. when the hardness is defined by the degree of penetration of a 1/1 cone into the sealant. This penetration is preferably 20 or more, and more preferably 30 or more. The shape of the sealant is appropriately selected and can be prepared by injection molding or press molding.

EXAMPLES

The following Examples and Comparative Examples further illustrate the present invention in detail.

The measurement of physical properties and evaluation of the molded articles obtained in the Examples and Comparative Examples were conducted by the following procedure.

(Compression Set)

It was measured at a measuring temperature of 70° C. for a measuring time of 24 hours in accordance with a "method for compression set test of vulcanized rubber" defined in JIS K6262. It was also measured at the measuring temperature of −30° C. and −20° C. At the temperature of −30° C. and −20° C., test samples were released from a compressing tool and were kept under the test temperature for 30 minutes, then the thickness of test samples were measured. The compression set was calculated. The compression set at −20° C. is preferably not more than 40 so that the rubber composition can be used as a sealant even at low temperature.

(Cone Penetration)

It was measured by using a 1/1-sized cone A in accordance with a consistency measuring method defined in JIS K2220. The measuring temperature was adjusted to 23° C.

(Recycling Properties)

It was judged whether or not the molded article can be injection-molded or press-molded after being chopped.
○: it is possible to be recycled
X: it is impossible to be recycled (Surface Texture)

The surface state of the injection-molded article was visually observed and then evaluated by the following criteria.
○: good surface texture
X: some defect such as unevenness on the surface exists (Tear Strength)

The tear strength of the molded test pieces (injection-molded article or press-molded test piece) was measured in accordance with a "method for tear test of vulcanized rubber" defined in JIS K6252.

(Rub Resistance)

After rubbing the surface of the molded articles (injection-molded article and press-molded article) with a nail 20 times, it was confirmed whether or not peel occurs on the surface and evaluation was conducted by the following criteria.
○: no peel was observed on the surface
X: peel was observed on the surface (Tack)

The tack of the molded articles (injection-molded article and press-molded article) was evaluated by the following criteria.
○: it exhibited sufficient tack for sealant
Δ: tack is too excessive or poor for sealant
X: tack required for sealant was not recognized (Tensile Strength TB and Elongation at Breakage EB)

The tensile strength of the molded test pieces (injection-molded article and press-molded test piece) was measured in accordance with a "method for tensile test of vulcanized rubber" defined in JIS K6251.

(Hardness)

It was measured by using an ASKER C2 harness tester (manufactured by Kobunshi Keiki Co., Ltd.).

(Gel Fraction)

The sample (molded article) is sufficiently dried, weighed ($w_1$ g), put in a stainless steel cage, and then dipped in toluene at 40° C. for 72 hours. After drawing up the cage, the sample is dried at room temperature for three days and further dried in a vacuum oven at 70° C. for 24 hours, and then the weight is measured ($w_2$ g). The gel fraction (%) is calculated by the following equation. Gel fraction={[$w_2$−$w_1$×(total parts of toluene insoluble component)/total parts]/[$w_1$×(total parts of toluene soluble component)/total parts]}×100.

The larger gel fraction indicates that the rubber component becomes more insoluble in toluene due to vulcanization, and the gel fraction means an indication which exhibits the vulcanization degree of the rubber.

Example 1

50 Parts by weight of EPDM (Esprene 532 manufactured by Sumitomo Chemical Co., Ltd.; content of ethylene based on the total amount 100 of ethylene, propylene and diene: 51% by weight; Mooney viscosity at 125° C.: 81; diene component: ENB; ratio of diene: 3.5%), 6 parts by weight of a resin vulcanizing agent (TACKIROL 250-III, manufactured by Taoka Chemical, Co., Ltd.) and 2.5 parts by weight of zinc oxide were mixed by using a kneader to obtain a chopped rubber. To 50 parts by weight of a styrene-ethylene-(ethylene-propylene)-styrene block copolymer (Septon 4077, manufactured by Kuraray Co., Ltd.), 400 parts by weight of a softener (Diana process oil PX-90, manufactured by Idemitsu Kosan Co. Ltd.) was added and sufficiently absorbed in the block copolymer by blending them. The blend was mixed with the chopped rubber and the mixture was dynamically vulcanized by using an extruder (HTM3838-2, manufactured by I-PEC CO., LTD.). At this time, the rotation speed of screws was adjusted to 200 rpm and the temperature was adjusted to 170° C. The polymer composition thus obtained was very flexible. The polymer composition was molded by using an injection molding machine (SG25-HIPRO MIIA, manufactured by Sumitomo Heavy Industries Co., Ltd.) and physical properties were measured.

Example 2

To 50 parts by weight of a styrene-ethylene-(ethylene)-propylene-styrene block copolymer (Septon 4077, manufactured by Kuraray Co., Ltd.), 400 parts of a softener (Diana process oil PX-90, manufactured by Idemitsu Kosan Co. Ltd.) was added and sufficiently absorbed in the block copolymer by blending them. To the blend, 50 parts by weight of EPDM (Esprene 532 manufactured by Sumitomo Chemical Industries Co., Ltd.), 2.5 parts by weight of zinc oxide and 0.5 parts by weight of stearic acid were added, followed by kneading using a kneader (MIX-LABO ML-500, manufactured by Moriyama Company Ltd.) for two minutes. At this time, the temperature was adjusted to 170° C. and the rotation speed was adjusted to 100 rpm. Then, 6 parts by weight of a resin vulcanizing agent (TACKIROL 250-III) manufactured by Taoka Chemical, Ltd.) was added and the mixture was kneaded until a kneading torque became maximum. Physical properties of the molded test piece obtained by press molding of the kneaded mixture were measured.

Example 3

To 50 parts by weight of a styrene-ethylene-propylene block copolymer (Septon 4077, manufactured by Kuraray Co., Ltd.), 400 parts of a softener (Diana process oil PX-90, manufactured by Idemitsu Kosan Co. Ltd.) was added and sufficiently absorbed in the block copolymer by blending them. To the blend, 50 parts by weight of EPDM (Esprene 532, manufactured by Sumitomo Chemical Co., Ltd.), 2.5 parts by weight of zinc oxide and 0.5 parts by weight of stearic acid were added, followed by kneading using a kneader (MIX-LABO ML-500, manufactured by Moriyama Company Ltd.) for two minutes. Then, vulcanization accelerators TET, BZ and TTTE were added in each amount of 0.25 parts by weight. After 1.5 minutes, sulfur and vulcanization accelerator M were further added in each amount of 0.5 parts by weight. The mixture was further kneaded for one minute after a kneading torque became maximum. Physical properties of the molded test pieces obtained by press molding of the kneaded mixture were measured.

Example 4

To 50 parts by weight of a styrene-ethylene-propylene block copolymer (Septon 4077, manufactured by Kuraray Co., Ltd.), 400 parts of a softener (Diana process oil PX-90, manufactured by Idemitsu Kosan Co. Ltd.) was added and sufficiently absorbed in the block copolymer by blending them. To the blend, 100 parts by weight (50 parts by weight of which is occupied by extension oil) of EPDM (Esprene 670F, manufactured by Sumitomo Chemical Co., Ltd.), 2.5 parts by weight of zinc oxide and 0.5 parts by weight of stearic acid were added, followed by kneading using a kneader (MIX-LABO ML-500, manufactured by Moriyama Company Ltd.) for two minutes. Then, vulcanization accelerators TET, BZ and TTTE were added in each amount of 0.25 parts by weight. After kneading for 1.5 minutes, 0.5 parts by weight of sulfur and 0.5 parts by weight of a vulcanization accelerator were added and the mixture was further kneaded for one minute after a kneading torque became maximum. Physical properties of the molded test pieces obtained by press molding of the kneaded mixture were measured.

Comparative Example 1

A kneaded mixture obtained by adding 500 parts by weight of a softener (Diana process oil PW-380, manufactured by Idemitsu Kosan Co. Ltd.) to 100 parts by weight of SEPS (Septon 2063, manufactured by Kuraray Co., Ltd.) and kneading the mixture was press-molded. Physical properties of the resulting molded test pieces were measured. The results are shown in Table 2. The resulting molded article could not used as a sealant because it caused too much permanent set at 70° C.

Comparative Example 2

A kneaded mixture obtained by adding 500 parts by weight of a softener (Diana process oil PW-380, manufactured by Idemitsu Kosan Co. Ltd.) to 100 parts by weight of SEBS (Tuftec H1075, manufactured by Asahi Chemical Industry Co., Ltd.) and kneading the mixture was press-molded. Physical properties of the resulting molded test pieces were measured. The results are shown in Table 2. The resulting molded article could not used as a sealant because it caused too much permanent set at 70° C.

Comparative Example 3

To 100 parts by weight of EPDM (Esprene 532 manufactured by Sumitomo Chemical Co., Ltd.), the components shown in Table 2 were added, followed by kneading and physical properties of the resulting molded test pieces were measured. The resulting molded article could not be easily recycled.

The evaluation results of Examples 1 to 4 and Comparative Examples 1 to 3 are shown in Table 1 and Table 2, respectively.

TABLE 1

|  | Example 1 | Example 2 | Example 3 | Example 4 |
| --- | --- | --- | --- | --- |
| SEEPS |  |  |  |  |
| Styrene content (%) | 30 | 30 | 30 | 30 |
| Molecular weight | 300,000 | 300,000 | 300,000 | 300,000 |
| EDPM |  |  |  |  |
| Ethylene content (%) | 51 | 51 | 51 | 66 |
| Mooney viscosity (125° C.) | 81 | 81 | 81 | 63* |
| Diene content (% by weight) | 3.5 | 3.5 | 3.5 | 3.5 |
| Extension oil amount (parts by weight) | 0 | 0 | 0 | 100 |
| Softener |  |  |  |  |
| Paraffin oil |  |  |  |  |
| Pour point (° C.) | −45 | −45 | −45 | −45 |
| Components (parts by weight) |  |  |  |  |
| SEEPS | 50 | 50 | 50 | 50 |
| EDPM (excluding extension oil) | 50 | 50 | 50 | 50 |

TABLE 1-continued

|  | Example 1 | Example 2 | Example 3 | Example 4 |
|---|---|---|---|---|
| Softener (including extension oil) | 400 | 400 | 400 | 450 |
| ISAF |  |  |  |  |
| Zinc oxide | 2.5 | 2.5 | 2.5 | 2.5 |
| Stearic acid | 0.5 | 0.5 | 0.5 | 0.5 |
| Resin vulcanizing agent | 6 | 6 |  |  |
| Sulfur |  |  | 0.5 | 0.5 |
| Vulcanization accelerator M |  |  | 0.5 | 0.5 |
| Vulcanization accelerator TET |  |  | 0.25 | 0.25 |
| Vulcanization accelerator BZ |  |  | 0.25 | 0.25 |
| Vulcanization accelerator TTTE |  |  | 0.25 | 0.25 |
| Physical properties |  |  |  |  |
| Injection molding | ○ | ○ | ○ | ○ |
| Recycling | ○ | ○ | ○ | ○ |
| Cone penetration | 67 | 63 | 82 | 60 |
| Compression set at 70° C. | 35 | 30 | 37 | 35 |
| Compression set at −20° C. | 49 | 50 | 62 | 76 |
| Compression set at −30° C. | 59 | 60 | 71 | 85 |

SEEPS: Septon 4077 is used
EDPM: Esprene 532 is used in Examples 1 to 3, while Esprene 670F is used in Example 4
Softener: process oil Diana PX-90 is used
*$ML_{1+4}$ (100° C.)

TABLE 2

|  | Comp. Example 1 | Comp. Example 2 | Comp. Example 3 |
|---|---|---|---|
| Thermoplastic resin | SEPS | SEBS |  |
| EDPM |  |  |  |
| Ethylene content (%) |  |  | 51 |
| Mooney viscosity (125° C.) |  |  | 81 |
| Diene content (% by weight) |  |  | 3.5 |
| Extension oil amount (parts by weight) |  |  | 0 |
| Softener |  |  |  |
| Paraffin oil |  |  |  |
| Pour point (° C.) | −15 | −15 | −45 |
| Components (parts by weight) |  |  |  |
| SEPS | 100 |  |  |
| SEBS |  | 100 |  |
| EDPM (excluding extension oil) |  |  | 100 |
| Softener (including extension oil) | 500 | 500 | 240 |
| ISAF |  |  | 50 |
| Zinc oxide |  |  | 5 |
| Stearic acid |  |  | 1 |
| Resin vulcanizing agent |  |  |  |
| Sulfur |  |  | 1 |
| Vulcanization accelerator M |  |  | 1 |
| Vulcanization accelerator TET |  |  | 0.5 |
| Vulcanization accelerator BZ |  |  | 0.5 |
| Vulcanization accelerator TTTE |  |  | 0.5 |
| Physical properties |  |  |  |
| Injection molding | ○ | ○ | Δ*2 |
| Recycling properties | ○ | ○ | X |

TABLE 2-continued

|  | Comp. Example 1 | Comp. Example 2 | Comp. Example 3 |
|---|---|---|---|
| Cone penetration | 140 | 130 | 37 |
| Compression set at 70° C. | >100*1 | >100*1 | 21 |
| Compression set at −20° C. | 84 | 81 | 26 |
| Compression set at −30° C. | 95 | 92 | 39 |

SEPS: Septon 2063 is used
SEBS: Tuftec H1075 is used
EDPM: Esperene 532 is used
*1Degree of deformation, after being kept under 70° C. for 24 hours, was larger than that given before heating (impossible to use as a sealant).
*2Injection molding can be conducted, but vulcanization for 30 minutes or more is required.

Example 5

To 45 parts by weight of SEEPS (trade name of "Septon 4077", manufactured by Kuraray Co., Ltd.) as the thermoplastic elastomer (A), 400 parts by weight of paraffin oil (trade name of "Diana process oil PX-90", manufactured by Idemitsu Kosan Co. Ltd.) as the softener (C) was added and sufficiently absorbed in the thermoplastic elastomer by sufficiently blending them.

On the other hand, 50 parts by weight of EPDM (component B, trade name of "Esprene 532" manufactured by Sumitomo Chemical Co., Ltd.; ethylene content: 51% by weight; Mooney viscosity at 125° C.: 81; ratio of diene component (ethylidene norbornene):3.5%) and 6 parts by weight of a resin vulcanizing agent (trade name of "TACK-IROL 250-III" manufactured by Taoka Chemical, Ltd.) were kneaded by using a kneader.

The blend was mixed with the rubber and 5 parts by weight of a polypropylene polymer (PP) [trade name of "Novatec PP BC6" manufactured by Japan Polychem Corporation] as the polypropylene polymer (a) and the mixture was dynamically vulcanized by using an extruder [manufactured by I-PEC CO., LTD., model No. "HTM3838-2"]. This dynamic crosslinking was conducted under the conditions of the rotation speed of 200 rpm in the extruder and the temperature of 180° C.

The polymer composition thus obtained was very flexible.

The resulting polymer composition was injection-molded by using an injection molding machine (manufactured by Sumitomo Heavy Industries Co., Ltd., model number "SG25-HIPRO MIIA") and evaluation of physical properties described hereinafter was conducted.

Example 6

In the same procedure as in Example 5, except that the amount of SEEPS (aforementioned "Septon 4077") was changed to 40 parts by weight, a blend which absorbed the softener (aforementioned "Diana process oil PX-90") was obtained.

The blend was mixed with the chopped rubber composed of EPDM (aforementioned "Esprene 532") and a resin vulcanizing agent (aforementioned "TACKIROL 250-III") obtained in the same procedure as in Example 5 and 10 parts by weight of the same PP (aforementioned "Novatec PP BC6") as that used in Example 5 and the mixture was dynamically vulcanized under the same conditions as those in Example 5.

The polymer composition thus obtained was injection-molded in the same manner as in Example 5 and evaluation of physical properties described above was conducted.

Example 7

In the same manner as in Example 5, except that the amount of SEEPS (aforementioned "Septon 4077") was changed to 35 parts by weight and the amount of PP (aforementioned "Novatec PP BC6") was changed to 15 parts by weight, a polymer composition was prepared and injection-molded, and then evaluation of physical properties described above was conducted.

Example 8

In the same manner as in Example 7, except that 15 parts by weight of aforementioned trade name of "Novatec PP 05BS" manufactured by Japan Polychem Corporation was used as the polypropylene polymer (PP) in place of aforementioned trade name of "Novatec PP BC6", a polymer composition was prepared and injection-molded, and then evaluation of physical properties described above was conducted.

Example 9

In the same manner as in Example 7, except that 15 parts by weight of a PP homopolymer [manufactured by Japan Polychem Company under the trade name of aforementioned "Novatec PP FY6H" was used as the polypropylene polymer (PP) in place of aforementioned "Novatec PP BC6", a polymer composition was prepared and injection-molded, and then evaluation of physical properties described above was conducted.

Comparative Example 4

To 100 parts by weight of SEPS ("Septon 2063", manufactured by Kuraray Co., Ltd.), 500 parts by weight of a softener ["Diana process oil PW-380" manufactured by Idemitsu Kosan Co. Ltd., pour point: −15° C.] was added and the mixture was kneaded.

The, kneaded mixture thus obtained was press-molded and evaluation of physical properties described above was conducted.

Comparative Example 5

To 100 parts by weight of SEBS (trade name of "Tuftec H1075", manufactured by Asahi Chemical Industry Co., Ltd.), 500 parts by weight of a softener [aforementioned "Diana process oil PW-380", pour point: −15° C.] was added and the mixture was kneaded.

The kneaded mixture thus obtained was press-molded and evaluation of physical properties was conducted.

Comparative Example 6

To 100 parts by weight of EPDM (aforementioned "Esprene 532", 240 parts by weight of a softener (aforementioned "Diana process oil PX-90", pour point: −45° C.), 50 parts by weight of carbon black (ISAF), 5 parts by weight of zinc oxide, 1 part by weight of stearic acid, 1 part by weight of sulfur, 1 part by weight of a vulcanization accelerator M (2-mercaptobenzothiazol), 0.5 parts by weight of a vulcanization accelerator TET (tetraethylthiuram disulfide), 0.5 parts by weight of a vulcanization accelerator BZ (zinc dibutylthiocaramate) and 0.5 parts by weight of a vulcanization accelerator TTTE(telllurium diethyldithiocarbamate) were added and the mixture was kneaded.

The kneaded mixture thus obtained was press-molded and evaluation of physical properties described above was conducted.

The measurement results of the polymer compositions (molded articles) obtained in Examples 5 to 9 and Comparative Examples 4 to 6 are shown in Tables 3 to 4.

TABLE 3

| | Examples | | | | |
|---|---|---|---|---|---|
| | 5 | 6 | 7 | 8 | 9 |
| Thermoplastic Elastomer (A) | SEEPS #4077 | SEEPS #4077 | SEEPS #4077 | SEEPS #4077 | SEEPS #4077 |
| Amount | 45 | 40 | 35 | 35 | 35 |
| Olefin resin (a) | PP | PP | PP | PP | PP |
| Amount | 5 | 10 | 15 | 15 | 15 |
| Rubber component (B) | EPDM #532 | EPDM #532 | EPDM #532 | EPDM #532 | EPDM #532 |
| Amount | 50 | 50 | 50 | 50 | 50 |
| Softener (C) | −45° C. PX-90 | −45° C. PX-90 | −45° C. PX-90 | −45° C. PX-90 | −45° C. PX-90 |
| Amount | 400 | 400 | 400 | 400 | 400 |
| Types of crosslinking agent | Resin | Resin | Resin | Resin | Resin |
| Surface texture | ○ | ○ | ○ | ○ | ○ |
| Tear strength [N/mm] | 1.8 | 2.0 | 2.5 | 2.1 | 1.8 |
| Rub resistance | ○ | ○ | ○ | ○ | ○ |
| Cone penetration | 62 | 50 | 42 | 40 | 38 |
| Compression set 70° C. | 23 | 20 | 22 | 21 | 18 |
| −20° C. | 59 | 58 | 59 | 56 | 57 |
| −30° C. | 67 | 66 | 69 | 65 | 66 |
| Tack | ○ | ○ | ○ | ○ | ○ |

TABLE 4

| | Comp. Examples | | |
|---|---|---|---|
| | 4 | 5 | 6 |
| Thermoplastic elastomer (A) | SEPS #2063 | SEBS #H1075 | — |
| Amount | 100 | 100 | — |
| Olefin resin (a) | — | — | — |
| Amount | — | — | — |
| Rubber component (B) | — | — | EPDM #532 |
| Amount | — | — | 100 |
| Softener (C) | −15° C. PW380 | −15° C. PW380 | −45° C. PX-90 |
| Amount | 500 | 500 | 400 |
| Types of crosslinking agent | — | — | Sulfur |
| Surface texture | ○ | ○ | — |
| Tear strength [N/mm] | —*1 | —*1 | |
| Rub resistance | X | X | Δ |
| Cone penetration | 140 | 130 | 37 |
| Compression set 70° C. | >100 | >100 | 21 |
| −20° C. | 84 | 81 | 26 |
| −30° C. | 95 | 92 | 39 |
| Tack | Δ*2 | Δ*3 | Δ*3 |

In Table 3, unit of "amount" is parts by weight.

In Table 4, "tear strength" could not be measured because of too large elongation (*1). The symbol *2of "tack" indicates "too strong tack" and the symbol *3 indicates "poor tack".

The polymer compositions obtained in Examples 5 to 9 could be injection-molded and recycled and were easy to mold and process, and also had good heat resistance as to deformation by heat. As is apparent from Tables 3 and 4, the polymer compositions were also superior in surface texture, rub resistance and tear strength. Furthermore, they were soft enough (had sufficient flexibility) and had moderate tack and compression set within a low temperature range was small enough.

Therefore, it has been found that the polymer compositions of Example 5 to 9 are compositions suited for use as a sealant of a telecommunication cable closure.

On the other hand, the molded articles of Comparative Examples 4 and 5 had a problem that they can not used as a sealant because they were melt down at 70° C. The molded article of Comparative Example 6 had a problem that it was not easily recycled.

Example 10

50 Parts by weight of EPDM (trade name of "Esprene 532" manufactured by Sumitomo Chemical Co., Ltd.; ethylene content: 51% by weight; Mooney viscosity at 125° C.: 81; ratio of diene component (ethylidene norbornene): 3.5%), 2.5 parts by weight of zinc oxide, 0.5 parts by weight of stearic acid and 6 parts by weight of a resin vulcanizing agent (trade name of "TACKIROL 250-III" manufactured by Taoka Chemical Co., Ltd. ) were kneaded by using a kneader.

To the rubber mixture, 35 parts by weight of SEEPS (trade name of "Septon 4077", manufactured by Kuraray Co., Ltd.) as the thermoplastic elastomer, 15 parts by weight of a polypropylene Novatec (PP) [trade name of "BC6" manufactured by Japan Polychem Corporation] as the polypropylene polymer and 5 parts by weight of carbon black (N-330) were added, followed by sufficient stirring. To the mixture, 400 parts by weight of paraffin oil [trade name of "Diana process oil PX-90", manufactured by Idemitsu Kosan Co. Ltd., pour point: −45° C., including extension oil] as the softener was added and sufficiently absorbed in the mixture by blending them.

The blend was supplied to an extruder [manufactured by I-PEC CO., LTD., model No. "HTM3838-2"] and dynamically vulcanized under the conditions of the rotation speed of 200 rpm in the extruder and the temperature of 180° C. The polymer composition thus obtained was very flexible.

The resulting polymer composition was injection-molded by using an injection molding machine (manufactured by Sumitomo Heavy Industries Co., Ltd., model number "SG25-HIPRO MIIA") and evaluation of physical properties described hereinafter was conducted.

Example 11

In the same manner as in Example 10, except that the amount of carbon black N-330 was changed to 10 parts by weight, a polymer composition was obtained and physical properties were evaluated.

Example 12

In the same manner as in Example 10, except that the amount of carbon black N-330 was changed to 17.5 parts by weight, a polymer composition was obtained and physical properties were evaluated.

Example 13

In the same manner as in Example 10, except that the amount of carbon black N-330 was changed to 25 parts by weight, a polymer composition was obtained and physical properties were evaluated.

Example 14

In the same manner as in Example 10, except that the amount of carbon black N-330 was changed to 37.5 parts by weight, a polymer composition was obtained and physical properties were evaluated.

Example 15

In the same manner as in Example 10, except that the amount of carbon black N-330 was changed to 50 parts by weight, a polymer composition was obtained and physical properties were evaluated.

Example 16

In the same manner as in Example 10, except that no carbon black was added, a polymer composition was obtained and physical properties were evaluated.

Comparative Example 7

In the same manner as in Example 10, except that the amount of carbon black N-330 was changed to 75 parts by weight, a polymer composition was obtained and physical properties were evaluated.

Formulations and evaluation results of physical properties of Examples 10 to 16 and Comparative Example 7 are summarized in Table 5.

TABLE 5

| | Examples | | | | | | | Comp. Ex. |
|---|---|---|---|---|---|---|---|---|
| | 10 | 11 | 12 | 13 | 14 | 15 | 16 | 7 |
| (Amount: parts by weight) | | | | | | | | |
| SEEPS | 35 | 35 | 35 | 35 | 35 | 35 | 35 | 35 |
| EPDM | 50 | 50 | 50 | 50 | 50 | 50 | 50 | 50 |
| PP | 15 | 15 | 15 | 15 | 15 | 15 | 15 | 15 |
| Softener (including extension oil) | 400 | 400 | 400 | 400 | 400 | 400 | 400 | 400 |
| Carbon black | 5 | 10 | 17.5 | 25 | 37.5 | 50 | 0 | 75 |
| Zinc oxide | 2.5 | 2.5 | 2.5 | 2.5 | 2.5 | 2.5 | 2.5 | 2.5 |
| Stearic acid | 0.5 | 0.5 | 0.5 | 0.5 | 0.5 | 0.5 | 0.5 | 0.5 |
| Resin vulcanizing agent | 6 | 6 | 6 | 6 | 6 | 6 | 6 | 6 |
| (Evaluation of physical properties) | | | | | | | | |
| Injection molding | ○ | ○ | ○ | ○ | ○ | ○ | ○ | ○ |
| Recycling | ○ | ○ | ○ | ○ | ○ | ○ | ○ | ○ |
| Cone penetration | 67 | 65 | 64 | 61 | 63 | 67 | 70 | 74 |
| Compression set (70° C.) | 23 | 24 | 23 | 27 | 30 | 45 | 23 | 58 |
| Tensile strength (Mpa) | 0.40 | 0.43 | 0.50 | 0.55 | 0.51 | 0.38 | 0.38 | 0.35 |
| Elongation at breakage (%) | 410 | 440 | 470 | 500 | 530 | 390 | 360 | 330 |
| Tear strength (N/mm) | 2.3 | 2.7 | 2.6 | 2.9 | 3.0 | 2.9 | 2.3 | 2.7 |

TABLE 5-continued

| | Examples | | | | | | Comp. Ex. |
|---|---|---|---|---|---|---|---|
| | 10 | 11 | 12 | 13 | 14 | 15 | 16 | 7 |
| Ascar C2 hardness | 26 | 24 | 25 | 25 | 25 | 22 | 25 | 17 |
| Gel fraction (%) | 85 | 86 | 84 | 82 | 80 | 53 | 88 | 45 |
| Tack | poor | poor | poor | poor | poor | severe | poor | noticeable |

Symbol ○ indicates that injection molding or recycling can be conducted.

The polymer compositions obtained in Examples 10 to 15 could be injection-molded and recycled and were easy to mold and process, and also had good heat resistance as to deformation at high temperature. As is apparent from Table 5, the polymer compositions had sufficient penetration (flexibility) and tack and proper tack and compression set within a low temperature range was sufficiently suppressed. Therefore, it has been found that the polymer compositions of Example 10 to 15 are compositions suited for use as a sealant of a telecommunication cable closure.

From a viewpoint of the relationship with the addition amount of carbon black, the polymer compositions of the respective Examples are improved in tensile strength, elongation at breakage and tear strength as compared with the case of adding no carbon black (Example 16). However, when carbon black is added in the amount of more than 50 parts by weight, like Comparative Example 7, it becomes unsuitable to use as the sealant because of large compression set, small hardness and too much tack.

The disclosures of Japanese Patent Application Nos. 2000-6902, 2000-92026 and 2000-180236, filed Jan. 4, 2000, Mar. 29, 2000 and Jun. 15, 2000, respectively, are incorporated herein by reference.

What we claim is:

1. A low modulus polymer composition comprising:
    (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer,
    (B) a rubber component containing an ethylene-propylene-diene rubber, and
    (C) a paraffin oil having a pour of not more than −35° C. as a softener,
wherein the amount of the softener (C) is not less than 200 parts by weight based on 100 parts by weight of the total amount of the components (A) and (B) and at least portion of the rubber component (B) is crosslinked by dynamic crosslinking, and wherein the hardness of said low modulus polymer composition is not less than 10 when represented by the degree of penetration of a 1/1-sized cone into the material at 23° C. and is not more than 10 when represented by, Japan Industrial Standard (JIS) A Hardness.

2. A low modulus polymer composition comprising:
    (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer,
    (a) an olefin polymer,
    (B) a rubber component containing an ethylene-propylene-diene rubber, and
    (C) a paraffin oil having a pour point of not more than −35° C. as a softener,
wherein the amount of the softener (C) is not less than 200 parts by weight based on 100 parts by weight of the total amount of the components (A), (a) and (B) and at least portion of the rubber component (B) is crosslinked by dynamic crosslinking, and wherein the hardness of said low modulus polymer composition is not less than 10 when represented by the degree of penetration of a 1/1-sized cone into the material at 23° C. and is not more than 10 when represented by Japan Industrial Standard (JIS) a Hardness.

3. A low modulus polymer composition comprising:
    (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer,
    (a) an olefin polymer,
    (B) a rubber component containing an ethylene-propylene-diene rubber,
    (C) a paraffin oil having a pour point of point more than −35° C. as a softener, and
    (D) carbon black,
wherein the amount of the softener (C) is not less than 200 parts by weight based on 100 parts by weight of the total amount of the components (A), (a) and (B) and at least portion of the component (B) is crosslinked by dynamic crosslinking, and wherein the hardness of said low modulus polymer composition is not less than 10 when represented by the degree of penetration of a 1/1-sized cone into the material at 23° C. and is not more than 10 when represented by Japan Industrial Standard (JIS) a Hardness.

4. The low modulus polymer composition according to claim 1, wherein the hydrogenated styrene-isoprene-styrene block copolymer contains a styrene-ethylene-ethylene-propylene-styrene block copolymer having both block, which alternatively repeats ethylene-propylene, and a block consisting of ethylene alone.

5. The low modulus polymer composition according to claim 1, wherein the rubber component containing an ethylene-propylene-diene rubber is crosslinked by a resin vulcanizing agent.

6. The low modulus polymer composition according to claim 1, wherein the rubber component contains an ethylene-propylene-diene rubber in the amount of not less than 50% by weight.

7. The low modulus polymer composition according to claim 1, wherein the ethylene content in the ethylene-propylene-diene rubber component is not more than 55% by weight.

8. The low modulus polymer composition according to claim 2, wherein the olefin polymer is a polypropylene polymer.

9. The low modulus polymer composition according to claim 3, wherein the content of the carbon black (D) is within a range from 10 to 40 parts by weight based on 100 parts by weight of the total amount of the components (A), (a) and (B).

10. The low modulus polymer composition according to claim 3, wherein the carbon black (D) has a particle diameter of not more than 80 nm and an oil absorption amount of not less than 80 cc/100 g.

11. A sealant comprising the low modulus polymer composition of any one of claims 1 to 5 and 6 to 10.

12. The sealant according to claim 11, which is used for sealing a gap between a cable and a closure body.

13. The low modulus polymer composition according to claim 1, comprising:
- (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer,
- (B) a rubber component containing an ethylene-propylene-diene rubber,
- (C) a softener, and
- (D) carbon black, wherein 100 parts by weight of the components (A) and (B) consist of 75–25 weight-% of component (A) and 25–75 weight-% of component (B), the amount of the softener (C) is not less than 200 parts by weight based on 100 parts by weight of the total amount of the components (A) and (B), the amount of the carbon black (D) is 5 to 50 parts by weight of the total amount of the components (A) and (B), and the rubber component (B) is at least 50% crosslinked by dynamic crosslinking.

14. The low modulus polymer composition according to claim 3, comprising:
- (A) at least one thermoplastic elastomer selected from the group consisting of a hydrogenated styrene-isoprene-styrene block copolymer, a hydrogenated styrene-butadiene-styrene block copolymer and a styrene-ethylene-ethylene-propylene-styrene block copolymer,
- (a) an olefin polymer,
- (B) a rubber component containing an ethylene-propylene-diene rubber,
- (C) a softener, and
- (D) carbon black, wherein 100 parts by weight of the components (A), (a) and (B) consist of 75–25 weight-% of components (A) and (a) and 25–75 weight-% of component (B), the amount of the softener (C) is not less than 200 parts by weight based on 100 parts by weight of the total amount of the components (A), (a) and (B), the amount of the carbon black (D) is 5 to 50 parts by weight of the total amount of the components (A), (a) and (B), and the rubber component (B) is at least 50% crosslinked by dynamic crosslinking.

* * * * *